United States Patent
Huotari et al.

(10) Patent No.: US 8,583,771 B2
(45) Date of Patent: Nov. 12, 2013

(54) MAPPING HUMAN-MEANINGFUL PARAMETERS TO NETWORK-MEANINGFUL PARAMETERS TO PERMIT USER TO ESTABLISH TRAFFIC IMPORTANCE IN HOME NETWORK

(75) Inventors: Allen Joseph Huotari, Garden Grove, CA (US); Kendra Harrington, Irvine, CA (US); Siddhartha Dattagupta, Fullerton, CA (US); Franklyn S. Nelson, Alameda, CA (US); Chong Liang Li, Chino Hills, CA (US)

(73) Assignee: Cisco Technology, Inc., San Jose, CA (US)

( * ) Notice: Subject to any disclaimer, the term of this patent is extended or adjusted under 35 U.S.C. 154(b) by 823 days.

(21) Appl. No.: 12/166,114

(22) Filed: Jul. 1, 2008

(65) Prior Publication Data

US 2010/0005170 A1 Jan. 7, 2010

(51) Int. Cl.
*G06F 15/173* (2006.01)

(52) U.S. Cl.
USPC .......................................... 709/223; 709/224

(58) Field of Classification Search
USPC .................................. 709/223, 224; 370/254
See application file for complete search history.

(56) References Cited

U.S. PATENT DOCUMENTS

| | | | | |
|---|---|---|---|---|
| 6,567,418 B1 * | 5/2003 | Farah | | 370/437 |
| 7,295,566 B1 * | 11/2007 | Chiu et al. | | 370/419 |
| 7,333,726 B2 * | 2/2008 | Kenny et al. | | 398/72 |
| 2004/0114595 A1 * | 6/2004 | Doukai | | 370/389 |
| 2005/0074063 A1 | 4/2005 | Nair et al. | | |
| 2006/0259640 A1 * | 11/2006 | Bonsma | | 709/245 |
| 2006/0268099 A1 | 11/2006 | Potrebic et al. | | |
| 2007/0027983 A1 * | 2/2007 | Bowra et al. | | 709/224 |
| 2007/0091800 A1 * | 4/2007 | Corcoran | | 370/230 |
| 2008/0205389 A1 | 8/2008 | Fang et al. | | |
| 2009/0019141 A1 * | 1/2009 | Bush et al. | | 709/223 |
| 2009/0031366 A1 | 1/2009 | Carhart et al. | | |
| 2009/0086688 A1 * | 4/2009 | Kvache et al. | | 370/338 |
| 2009/0225746 A1 * | 9/2009 | Jackson et al. | | 370/352 |
| 2009/0252219 A1 * | 10/2009 | Chen et al. | | 375/240.02 |
| 2009/0276059 A1 * | 11/2009 | Tone et al. | | 700/7 |
| 2009/0326684 A1 * | 12/2009 | Wang et al. | | 700/83 |
| 2010/0005170 A1 * | 1/2010 | Huotari et al. | | 709/225 |
| 2010/0031299 A1 | 2/2010 | Harrang et al. | | |
| 2010/0057668 A1 | 3/2010 | Nelson et al. | | |
| 2010/0223339 A1 * | 9/2010 | Cheng et al. | | 709/206 |

OTHER PUBLICATIONS

Bonjour Printing Specification. Version 1.0.2, Apple Computer, Inc. pp. 1-24. Apr. 12, 2005.
UPnP QoS Architecture:2, Song et al., Contributing members of the UPnP Forum. For UPnP Version 1.0, Document version 1:00, pp. 1-33. Oct. 16, 2006.
USPTO Dec. 22, 2011 Request for Continued Examination Response to Sep. 22, 2011 Final Office Action in U.S. Appl. No. 12/204,143.
USPTO Aug. 5, 2011 Response to May 5, 2011 Non-Final Office Action from U.S. Appl. No. 12/204,143.
USPTO Sep. 22, 2011 Final Office Action in U.S. Appl. No. 12/204,143.
USPTO May 5, 2011 Nonfinal Office Action from U.S. Appl. No. 12/204,143.

\* cited by examiner

*Primary Examiner* — Phuoc Nguyen
*Assistant Examiner* — Davoud Zand
(74) *Attorney, Agent, or Firm* — Patent Capital Group

(57) ABSTRACT

A method of describing highly valued traffic in a home network in terms that are meaningful for a human and that are translated to useful network parameters.

20 Claims, 3 Drawing Sheets

Example System

Overall Logic

Mapping Logic

Importance Establishment and Traffic Delivery

Media Player Ranking

Please list your media players in order of importance. The Media Player at the top of your list will be given the best possible playback quality. The playback quality for the Media Player at the bottom of your list will be the first to be affected if network conditions are poor or bandwidth is inadequate.

Media Players
1. Living Room Media Player
2. Master Bedroom TV(Offline)
3. Bedroom TV
4. Office TV Brand:
Model:
Description:

Learn more about Media Player Ranking

[Disabled] [Normal] [Over] [Click]

[◀ Back] [Next ▶]

[Move Up]
[Move Down]
[Save]

FIG. 5 Example User Interface

MAPPING HUMAN-MEANINGFUL PARAMETERS TO NETWORK-MEANINGFUL PARAMETERS TO PERMIT USER TO ESTABLISH TRAFFIC IMPORTANCE IN HOME NETWORK

FIELD OF THE INVENTION

The present application relates generally to mapping human-meaningful parameters to network-meaningful parameters to permit a user to establish traffic importance in home networks.

BACKGROUND OF THE INVENTION

As networking and digital media technologies advance, network-enabled consumer electronic devices have been introduced that can store, manage, and/or playback different types of digital media content. For example, all of a user's digital music, video and photos may be stored on a network storage device, and a digital media player used to render all the content on the HDTV in a user's living room.

Because a network might not have sufficient bandwidth to carry all demanded traffic simultaneously, data may be prioritized using information in the data packets including, for example, destination IP address with subnet mask, originating IP address with subnet mask, source media access control (MAC) address, destination MAC address, protocol, source/destination port, and other network-meaningful parameters. As understood herein, however, these parameters are not necessarily meaningful to non-technical users, who may wish to define what traffic is more important to the user and what traffic is less important in terms of e.g., network devices that the user considers to be more important at particular times of day. Furthermore, it is possible that identical classifications for data can be generated based upon network-meaningful parameters, diminishing the value to the user of the quality of experience provided to the user.

BRIEF DESCRIPTION OF THE DRAWINGS

The details of non-limiting embodiments, both as to its structure and operation, can best be understood in reference to the accompanying drawings, in which like reference numerals refer to like parts, and in which:

FIG. 5 is an example user interface in accordance with present principles.

DESCRIPTION OF EXAMPLE EMBODIMENTS

Overview

Accordingly, the present invention recognizes the desirability to provide for human friendly rules for establishing home network traffic policy so that the network has the ability to appropriately classify, prioritize, and perform admission control.

A method in accordance with the above includes establishing relationships between home network parameters and abstractions of the home network parameters. As set forth further below, the abstractions may be human-meaningful terms that are displayed (e.g., visibly or audibly) so that a user is permitted to establish data traffic importances in a home network using the abstractions. The data traffic importances are implemented using the home network parameters. In specific embodiments, this is done in part by mapping the human-meaningful terms to respective network parameters.

For example, a human-meaningful term can be a user-established device name and a respective network parameter corresponding to the user-established device name can be a destination address. Or, a human-meaningful term can be a manufacturer-established device model designation and a respective network parameter corresponding to the model designation can be a destination address. Yet again, a human-meaningful term can be a device capability (such as "high definition display device") and a respective network parameter corresponding to the device capability may be a protocol type.

In another example, an apparatus can include a processor and a computer-readable medium accessible to the processor and bearing mapping between network parameters and human-meaningful terms in a home network. The network parameters are useful by a computer to convey data traffic in the home network, while the human-meaningful terms are useful for presenting a user interface to a person.

In another example, a residential gateway (RG) is configured to establish communication between a wide area network and a home network. The RG includes a processor and a tangible computer-readable medium accessible to the processor and bearing a data structure correlating terms that are meaningful to a human to respective network parameters to implement user-defined traffic importance in the home network.

Example Embodiments

Figure 1:
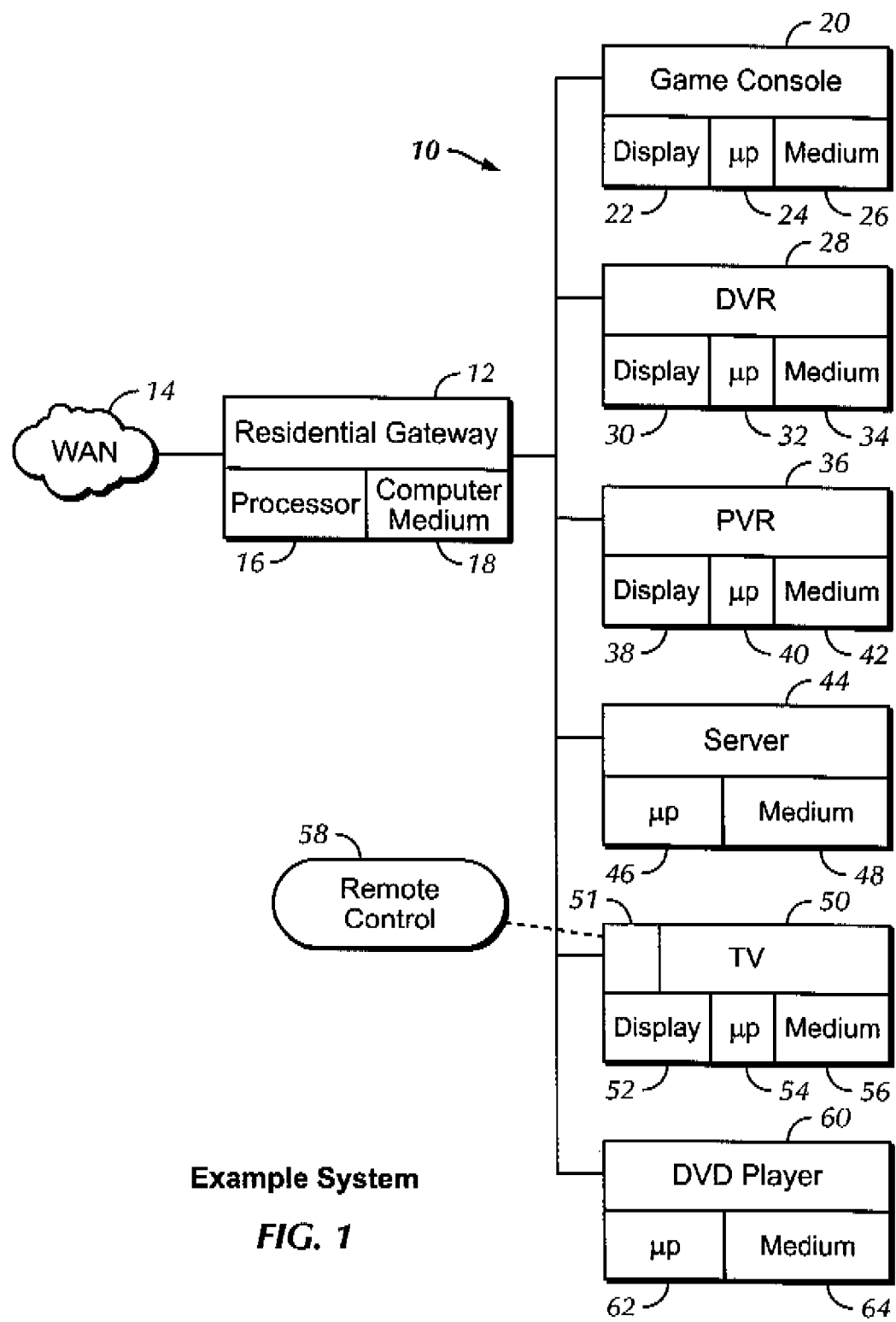
FIG. 1 is a block diagram of an example system.

Referring initially to FIG. 1, a home network is shown, generally designated 10, which includes a residential gateway (RG) 12 that is configured to establish communication between a wide area network (WAN) 14 and plural consumer electronics (CE) devices communicating over the home network using, in one example implementation, Universal Plug-n-Play (UPnP™) The RG 12 includes a RG processor 16 and a RG tangible computer-readable medium 18 accessible to the RG processor 16.

By way of non-limiting example, the CE devices of the home network 10 may include game console 20 with video display 22, processor 24, and computer-readable medium 26. The home network 10 may also include a digital video recorder (DVR) 28 that in some embodiments may include a video display 30, processor 32, and computer-readable medium 34. The home network 10 may also include a personal video recorder (PVR) 36 that in some embodiments may include a video display 38, processor 40, and computer-readable medium 42. Further, the home network 10 may include a server computer 44 that includes a processor 46 and computer-readable medium 48. A TV 50 may also be included in the network 10, and the TV 50 typically includes, among TV components such as a tuner 51, a TV display 52, TV processor 54, and computer readable medium 56. The TV 50 may be controlled using a remote control 58. A DVD player 60 may also be on the network and can include a processor 62 and computer readable medium 64.

The logic described herein may be stored in the form of computer-readable code on any one or more of the above-described computer readable media for execution by any one or more of the above-described processors. In one embodiment the logic is implemented by the RG 12. In any case, the computer-readable media may be, without limitation, disk drives, solid state memory, etc.

Figure 2:
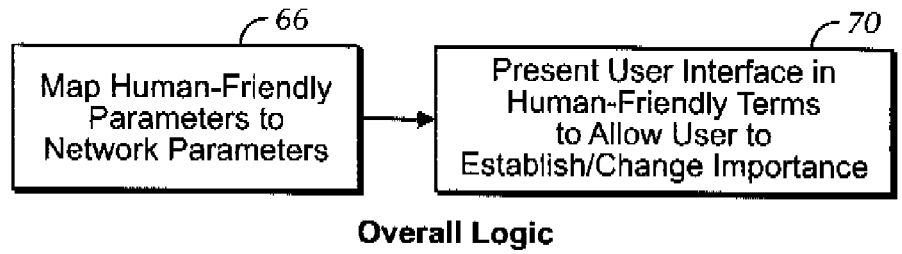
FIG. 2 is a flow chart of example overall logic.

The overall logic may be seen in reference to FIG. 2. Commencing at block 66, human-meaningful terms are mapped to network parameters. This may be done automatically by, e.g., discovering devices on the network and correlating manufacturer-defined model designations to MAC addresses and/or IP addresses and/or ports and/or other network parameters, or it may be done as a device is added by the user to a network. In the latter case the user, during initialization, can be prompted to enter a user-defined device name (which can include a person's name, e.g., "John's TV" or a place name, e.g., "bedroom TV") that is then correlated to a network parameter. In any case, the human-meaningful terms are examples of abstractions of the respective network parameters that are more easily understood and thus more useful to a non-technical user than are the network parameters.

At block 70, a user interface (UI) such as the example described further below in reference to FIG. 5 may be audibly or visibly presented on, e.g., the TV 50 to enable a user to select/reorder the human-meaningful terms. Thus, the UI may present a list of devices by their human-meaningful terms as opposed to their network parameters and a user may reorder the list using, e.g., the remote control 58 to thereby establish which CE devices in the network 10 are more important destinations of traffic and which CE devices may be less important. Similarly, sources of traffic may be ordered by importance.

Figure 3:
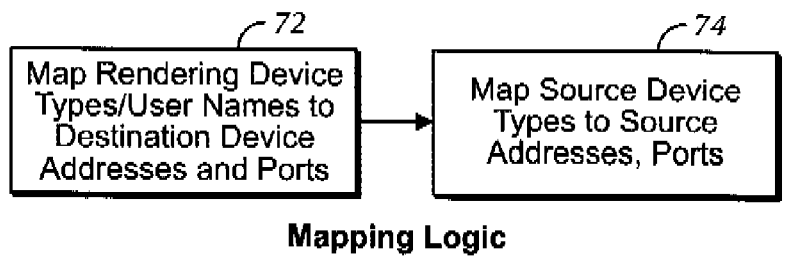
FIG. 3 is a flow chart of an example mapping logic.

The above-described mapping is shown in greater detail at blocks 72 and 74 of FIG. 3. At block 72 the human-meaningful names of rendering devices are mapped to destination addresses and/or ports, whereas at block 74 the human-meaningful names of content source devices are mapped to destination addresses and/or ports. It is to be understood that if desired, device capabilities may be mapped to protocol type, and the user may be given the opportunity to establish the importance of traffic by device capability.

In a general sense, in human-meaningful terms, the following sentence can be mapped to network parameters as follows: (someone/some thing/some place) wants to execute (a function) with (some device) at (some time). (Someone/some thing/some place) is a human-meaningful term that maps to the network parameter(s) of destination device address and/or port of the CE device sought to be viewed (such as the TV 50, game console 20, etc.), whereas (function) maps to an action such as "play", "record", etc. (Some device) is a human-meaningful term that maps to the network parameter(s) of source device address and/or port of the source device (e.g., the server 44 or DVR 28 or PVR 36 or DVD player 60) that holds the content (audio, video, photographs, etc.) that is desired. (Some device) may also map to a protocol type.

Figure 4:
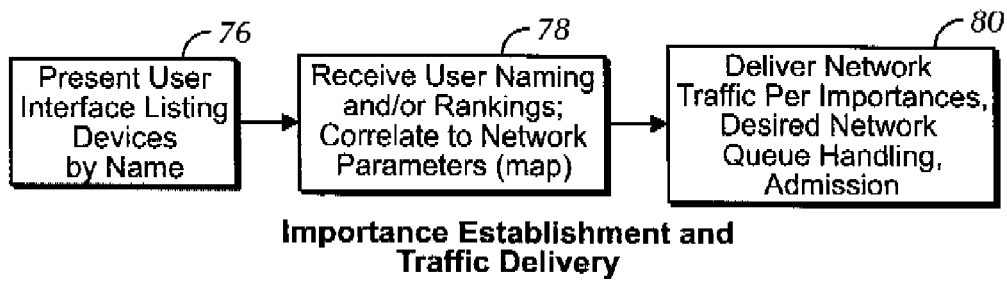
FIG. 4 is a flow chart of an example importance-establishing logic.

Turning to FIG. 4 for additional explication of the above principles, at block 76 the UI is presented that lists devices by human-meaningful terms, e.g., by name. At block 78 the user's naming and typically importance rankings by human-meaningful terms are received, with the respective network parameters also being thus ranked by user-defined importance. The user-defined importances are implemented at block 80 during subsequent traffic transmission over the network 10 using the rankings of the underlying network parameters and if desired in accordance with other queue handling and admissions policies. In this way, the underlying network infrastructure need not be altered but can continue to operate using network parameters, while the user's experience is abstracted from those parameters by means of the human-meaningful terms.

An example non-limiting UI is shown at 82 in FIG. 5 and may be presented on, e.g., the TV display 52. As shown, the UI lists devices in human-meaningful terms and not by network parameters. As examples, the UI lists "living room media player", a term that the user may have previously input during set-up, "master bedroom TV", "bedroom TV", and "office TV", and the list may also indicate whether a device is online.

If desired, the UI 82 may include a descriptor window 84 that sets forth information about the currently-highlighted device, e.g., brand name, model name, and device description as might be discovered using network discovery principles known in the art. In any case, the user can navigate a screen cursor by means of, e.g., the remote control 58 to select a device, and then operate a "move up" button 86 to move the device up in the list, effectively increasing its importance. A "move down" 88 can also be selected to move the device down in the list to decrease its importance. Traffic is prioritized on the network according to the user-defined importances.

If desired, policies may be implemented to assign importance-ranked traffic to queues. For example, an egress traffic queue may be established with multiple levels. An intermediate queue may be established between the traffic source(s) and egress queue, and the intermediate queue can have a greater number of levels than the egress queue. To simplify the explanation, it can be assumed that two levels of intermediate queues are established per level of egress queue.

A scheduler, which may be implemented by the RG or by any other network device such as a router that can understand the mappings and implement scheduling per the importances, may be established between the intermediate queue and the egress queue that can service (or forward) each priority level of the intermediate queue in a weighted fashion. Then, it may be assumed that the higher priority levels of the intermediate queue carry "important" traffic. Using the simplified assumption, if the egress queue has four levels (such as, for instance, voice, video, best effort, background) then the intermediate queue would have eight levels that may be assigned into four queue pairs, with each pair corresponding to a given category in the egress queue. Traffic of a particular type that is designated as "important" is assigned to the upper queue in each pair (and is considered admitted)—while less important traffic can be assigned to the lower queue in each pair (and is considered non-admitted).

Accordingly, human-meaningful terms including user identity, device type, device capabilities, device configuration, device location, stream function (e.g., record, live pay for view, pay per view (play remotely stored), playback (play locally stored), content type (audio, video, etc.), and time of day can be mapped to network parameters and used to establish policy and thus assist classification and admission control for home networking quality of service.

While the particular MAPPING HUMAN-MEANINGFUL PARAMETERS TO NETWORK-MEANINGFUL PARAMETERS TO PERMIT USER TO ESTABLISH TRAFFIC IMPORTANCE IN HOME NETWORK is herein shown and described in detail, it is to be understood that the subject matter which is encompassed by the present invention is limited only by the claims.

What is claimed is:
1. A method comprising:
discovering a plurality of network devices operating in a home network, the network devices communicating with a residential gateway, which provides network connectivity to the network devices;

permitting a user to establish a ranking of the devices in the home network using abstractions, wherein each device receives at least two unique types of traffic and the sources of the at least two unique types of traffic are ordered by importance, wherein data traffic importances are used in corresponding policies that define queues for each type of traffic associated with the network devices; and implementing the data traffic importances such that traffic associated with the network devices is prioritized amongst each other based on the data traffic importances, and wherein the residential gateway includes a scheduler configured to manage data traffic from the network devices in an intermediate queue and an egress queue, the scheduler being further configured to service priority levels in a weighted fashion.

2. The method of claim 1, wherein the abstractions are human-meaningful terms.

3. The method of claim 2, comprising mapping the human-meaningful terms to respective network parameters.

4. The method of claim 3, wherein at least one abstraction is a user established device name and wherein at least one network parameter corresponding to the user-established device name is a port identifier.

5. The method of claim 2, wherein at least one human-meaningful term is a manufacturer-established device mode designation and a respective network parameter corresponding to a model designation is a destination address.

6. The method of claim 2, wherein at least one human-meaningful term is a device capability and a respective network parameter corresponding to a capability of the device is a protocol type.

7. The method of claim 2, wherein a data structure correlating the human-meaningful terms to respective network parameters is stored in the residential gateway communicating with a wide area network.

8. The method of claim 1, wherein the scheduler is further configured to service priority levels within the intermediate queue in a weighted fashion, the priority levels being based on the data traffic importances.

9. The method of claim 1, wherein the intermediate queue has a greater number of levels than the egress queue.

10. The method of claim 1, wherein the intermediate queue has two levels of intermediate queues per level of egress queue.

11. The method of claim 10, wherein a first level of the intermediate queue is designated for traffic identified as important and is considered admitted and a second level of the intermediate queue is designated for traffic identified as not important and is considered not admitted.

12. An apparatus comprising:
at least one processor; and
at least one computer-readable medium accessible to the processor, wherein the processor and the computer-readable medium are configured to cooperate in order to:
discover a plurality of network devices operating in a home network, wherein the network devices are ranked and each network device receives at least two unique types of traffic, wherein the sources of the at least two unique types of traffic are ordered by importance, the network devices communicating with the apparatus, which provides network connectivity to the network devices; and map network parameters and human-meaningful terms, the network parameters being used by a computer to manage data traffic in the home network, wherein data traffic importances are used in corresponding policies that define queues for each type of traffic associated with the network devices, the human-meaningful terms being configured for rendering via a user interface, wherein at least one human-meaningful term is a user-established device name, wherein the data traffic importances are implemented such that traffic associated with the network devices is prioritized amongst each other based on the data traffic importances; and a scheduler configured to manage data traffic from the network device in an intermediate queue and an egress queue, the scheduler being further configured to service priority levels in a weighted fashion.

13. The apparatus of claim 12, wherein the network parameters include device addresses.

14. The apparatus of claim 12, wherein the network parameters include protocol type.

15. The apparatus of claim 12, wherein the human-meaningful terms include at least one network device name established by a user of the home network.

16. The apparatus of claim 12, wherein the human-meaningful terms include at least one model designation of a network device, the model designation being established by a manufacturer of the network device.

17. A residential gateway (RG) configured to interact with a first network and a home network, the RG comprising:
at least one processor; and
at least one tangible computer-readable medium accessible to the processor and bearing at least one data structure correlating terms that are meaningful to a human to respective network parameters to implement user-defined traffic importance in the home network, wherein the home network contains a plurality of ranked network devices, wherein each device receives at least two unique types of traffic and the sources of the at least two unique types of traffic are ordered by importance, wherein traffic importances are used in corresponding policies that define queues for each type of traffic associated with the network devices, and wherein at least one term is a user-established device name, wherein the traffic importances are implemented such that traffic associated with the network devices is prioritized amongst each other based on the traffic importances, and wherein the residential gateway includes a scheduler configured to manage data traffic from the network devices in an intermediate queue and an egress queue, the scheduler being further configured to service priority levels in a weighted fashion.

18. The RG of claim 17, wherein the terms that are meaningful to a human are presented on a user interface to allow the user to establish the traffic importances.

19. The RG of claim 17, wherein the network parameters include a port identifier.

20. The RG of claim 17, wherein the terms that are meaningful to a human include at least one model designation of a network device, the model designation being established by a manufacturer of the network device.

* * * * *